(12) United States Patent
Iwasaki et al.

(10) Patent No.: US 11,568,177 B2
(45) Date of Patent: Jan. 31, 2023

(54) SEQUENTIAL DATA ANALYSIS APPARATUS AND PROGRAM

(71) Applicants: KABUSHIKI KAISHA TOSHIBA, Minato-ku (JP); TOSHIBA SOLUTIONS CORPORATION, Kawasaki (JP)

(72) Inventors: Hideki Iwasaki, Fuchu (JP); Shigeaki Sakurai, Yokohama (JP); Rumi Hayakawa, Yokohama (JP); Shigeru Matsumoto, Nishitokyo (JP)

(73) Assignees: KABUSHIKI KAISHA TOSHIBA, Minato-ku (JP); TOSHIBA SOLUTIONS CORPORATION, Kawasaki (JP)

( * ) Notice: Subject to any disclaimer, the term of this patent is extended or adjusted under 35 U.S.C. 154(b) by 921 days.

(21) Appl. No.: 15/527,784

(22) PCT Filed: Jan. 19, 2015

(86) PCT No.: PCT/JP2015/000200
§ 371 (c)(1),
(2) Date: May 18, 2017

(87) PCT Pub. No.: WO2016/116958
PCT Pub. Date: Jul. 28, 2016

(65) Prior Publication Data
US 2017/0330055 A1    Nov. 16, 2017

(51) Int. Cl.
*G06N 20/00* (2019.01)
*G06N 5/04* (2006.01)
(Continued)

(52) U.S. Cl.
CPC ........... *G06K 9/6262* (2013.01); *G06N 5/025* (2013.01); *G06N 5/047* (2013.01); *G06Q 10/10* (2013.01);
(Continued)

(58) Field of Classification Search
CPC ...... G06K 9/6262; G06N 5/047; G06N 20/00; G06N 5/025; G06Q 10/10; G06Q 30/0201; G06Q 30/0202
See application file for complete search history.

(56) References Cited

U.S. PATENT DOCUMENTS 5,103,498 A * 4/1992 Lanier ...................... G06N 5/04
706/58
5,761,389 A * 6/1998 Maeda ................... G06N 5/025
706/59

(Continued)

FOREIGN PATENT DOCUMENTS

JP    2000-155681 A    6/2000
JP    2007-34700 A     2/2007
(Continued)

OTHER PUBLICATIONS

Sloman, "Feature-Based Induction", 1993 (Year: 1993).*
(Continued)

*Primary Examiner* — Omar F Fernandez Rivas
*Assistant Examiner* — Selene A. Haedi
(74) *Attorney, Agent, or Firm* — Oblon, McClelland, Maier & Neustadt, L.L.P.

(57) ABSTRACT

A sequential data analysis apparatus extracts a pattern of two or more sets of items based on an appearance frequency of each of different sets of items in first sequential data, selects a pattern of two or more sets of items based on an appearance frequency of a sub-pattern formed of a portion of the extracted pattern, creates a related pattern including the
(Continued)

same last set of items as and the other sets of items different from the selected characteristic pattern, calculates an evaluation value of the related pattern, creates a prediction model by organizing data of the characteristic pattern and the related pattern, and applies second sequential data to the prediction model to determine a result which the second sequential data is likely to lead to.

4 Claims, 20 Drawing Sheets

(51) Int. Cl.
    *G06K 9/62*         (2022.01)
    *G06N 5/02*         (2006.01)
    *G06Q 30/02*       (2012.01)
    *G06Q 10/10*       (2012.01)

(52) U.S. Cl.
    CPC ..... *G06Q 30/0201* (2013.01); *G06Q 30/0202* (2013.01); *G06N 20/00* (2019.01)

(56) References Cited

U.S. PATENT DOCUMENTS

| | | | |
|---|---|---|---|
| 6,418,425 | B1 | 7/2002 | Maeda et al. |
| 2003/0236785 | A1* | 12/2003 | Shintani .................. G06F 16/30 |
| 2007/0038587 | A1 | 2/2007 | Watanabe et al. |
| 2007/0079195 | A1 | 4/2007 | Ueno et al. |
| 2007/0219992 | A1* | 9/2007 | Bollinger ............ G06F 16/2465 |
| 2008/0033895 | A1* | 2/2008 | Sakurai ............. G06F 16/90348 |
| | | | 706/13 |
| 2008/0222109 | A1 | 9/2008 | Sakurai |
| 2009/0119584 | A1* | 5/2009 | Herbst .................. G06F 16/367 |
| | | | 715/273 |
| 2013/0054552 | A1* | 2/2013 | Hawkins ................ G06N 7/005 |
| | | | 707/706 |
| 2014/0330843 | A1* | 11/2014 | Park ....................... G16B 40/00 |
| | | | 707/748 |

FOREIGN PATENT DOCUMENTS

| | | |
|---|---|---|
| JP | 2007-48200 A | 2/2007 |
| JP | 2007-66058 A | 3/2007 |
| JP | 2008-176431 A | 7/2008 |
| JP | 2008-220511 A | 9/2008 |

OTHER PUBLICATIONS

Mochales et al., "Argumentation mining", 2011 (Year: 2011).*
Ramakrishnan Srikant, et al., "Mining Sequential Patterns: Generalizations and Performance Improvements", Total 15 Pages, In Proceedings of International Conference on Extending Database Technology, (1996).
Shigeaki Sakurai, et al., "The Effect of Constraints among Items for an Sequential Pattern Analysis", The 27th Annual Conference of the Japanese Society for Artificial Intelligence, Total 12 Pages, (2013), (with English Translation).
Shigeaki Sakurai, "Data Mining Techniques", Journal of Japan Society for Fuzzy Theory and Intelligent Informatics, vol. 21, No. 3, Total 12 Pages, (Jun. 15, 2009).
Hiroshi Ishikawa, et al., "Connection to the future with Digital series 11 Data maining and collective intelligence from basics to Web and social media", Kyoritsu Shuppan Co., Ltd., First Edition, Total 24 Pages, (Jul. 15, 2012), (with English Translation).
International Search Report dated Mar. 3, 2015 in PCT/JP2015/000200 Filed Jan. 19, 2015.

* cited by examiner

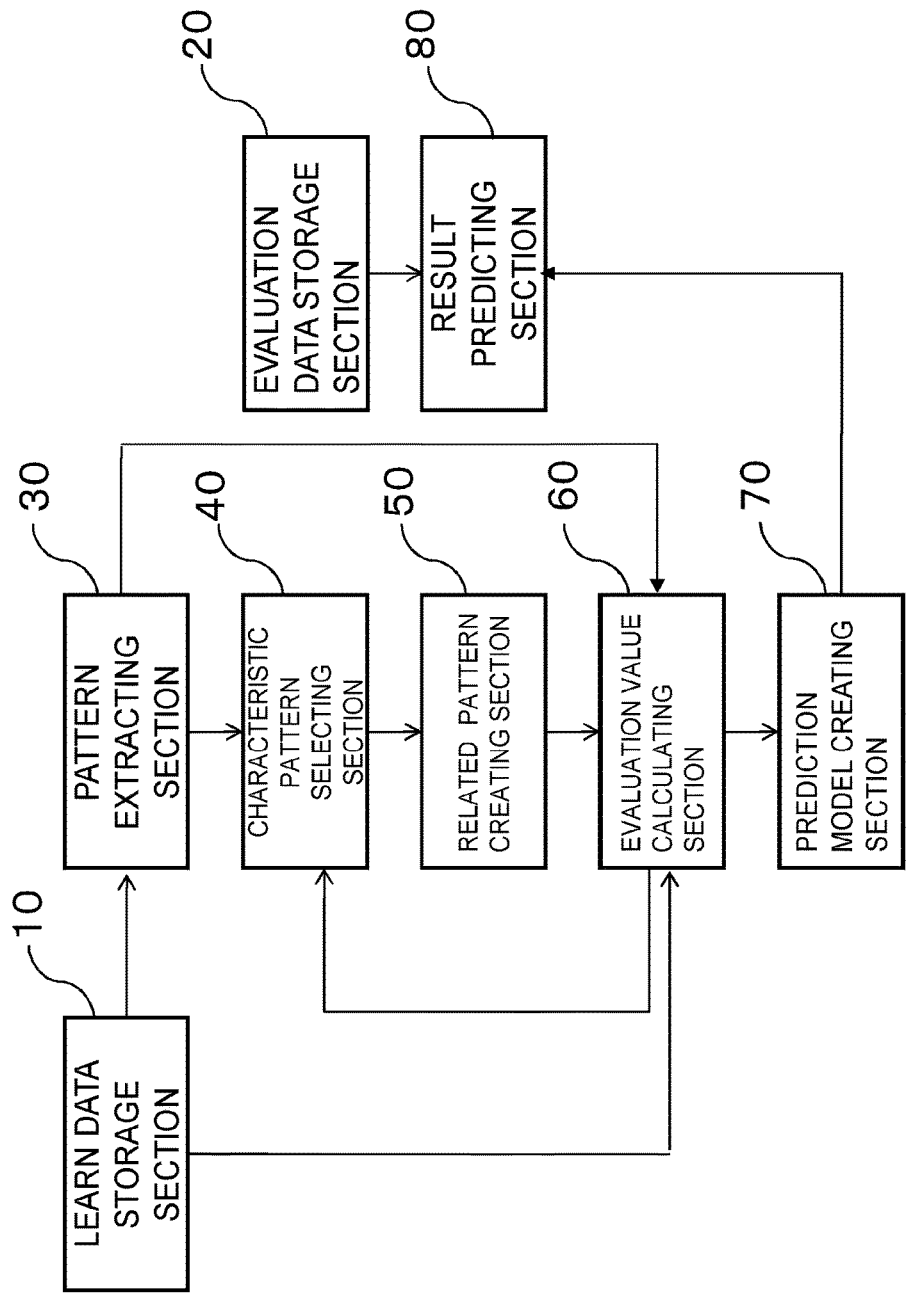
[FIG1]

[FIG2]
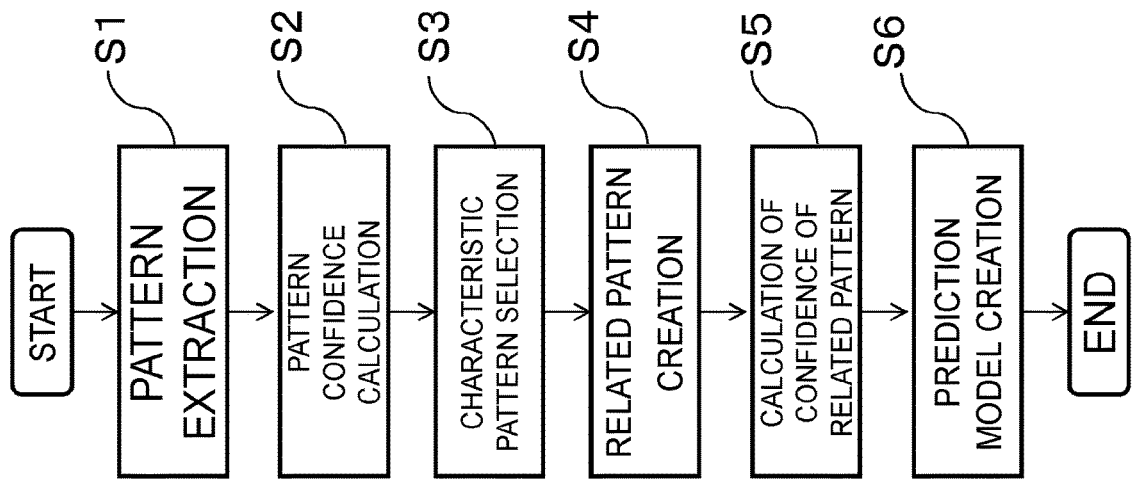

[FIG3]
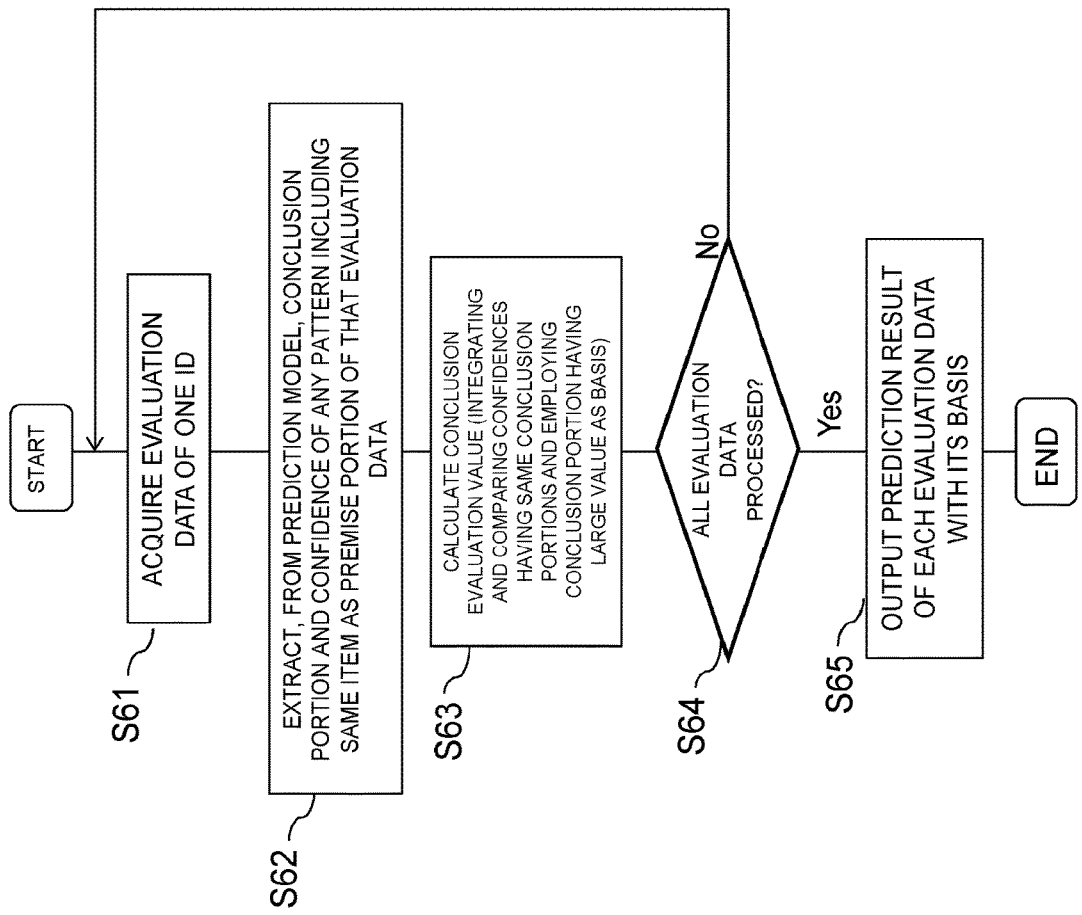

[FIG4]

| ATTRIBUTE | ATTRIBUTE VALUE |
|---|---|
| WEATHER | SUNNY, RAINY, CLOUDY |
| TEMPERATURE | HIGH, NORMAL 1, LOW |
| TYPE OF DAY | WEEKDAY, HOLIDAY |
| NUMBER OF PEOPLE GOING OUT | MANY, NORMAL 2, FEW |
| CONGESTION | OCCUR, NOT OCCUR |

[FIG5]

| ID | LEARN DATA |
|---|---|
| T1 | {WEATHER: SUNNY, TEMPERATURE: NORMAL 1} -> {CONGESTION: OCCUR} |
| T2 | {WEATHER: SUNNY, TEMPERATURE: NORMAL 1} -> {NUMBER OF PEOPLE GOING OUT: NORMAL 2} |
| T3 | {WEATHER: SUNNY, TEMPERATURE: NORMAL 1} -> {CONGESTION: OCCUR} |
| T4 | {WEATHER: CLOUDY, TYPE OF DAY: WEEKDAY} -> {NUMBER OF PEOPLE GOING OUT: MANY} |
| T5 | {WEATHER: SUNNY, NUMBER OF PEOPLE GOING OUT: MANY} -> {CONGESTION: OCCUR} |
| T6 | {WEATHER: RAINY, NUMBER OF PEOPLE GOING OUT: FEW} -> {CONGESTION: NOT OCCUR} |
| T7 | {TEMPERATURE: HIGH} -> {CONGESTION: NOT OCCUR} |
| T8 | {TYPE OF DAY: WEEKDAY} -> {NUMBER OF PEOPLE GOING OUT: FEW} |
| ... | ... |
| Tn | {WEATHER: CLOUDY, TEMPERATURE: NORMAL 1} -> {NUMBER OF PEOPLE GOING OUT: MANY} |

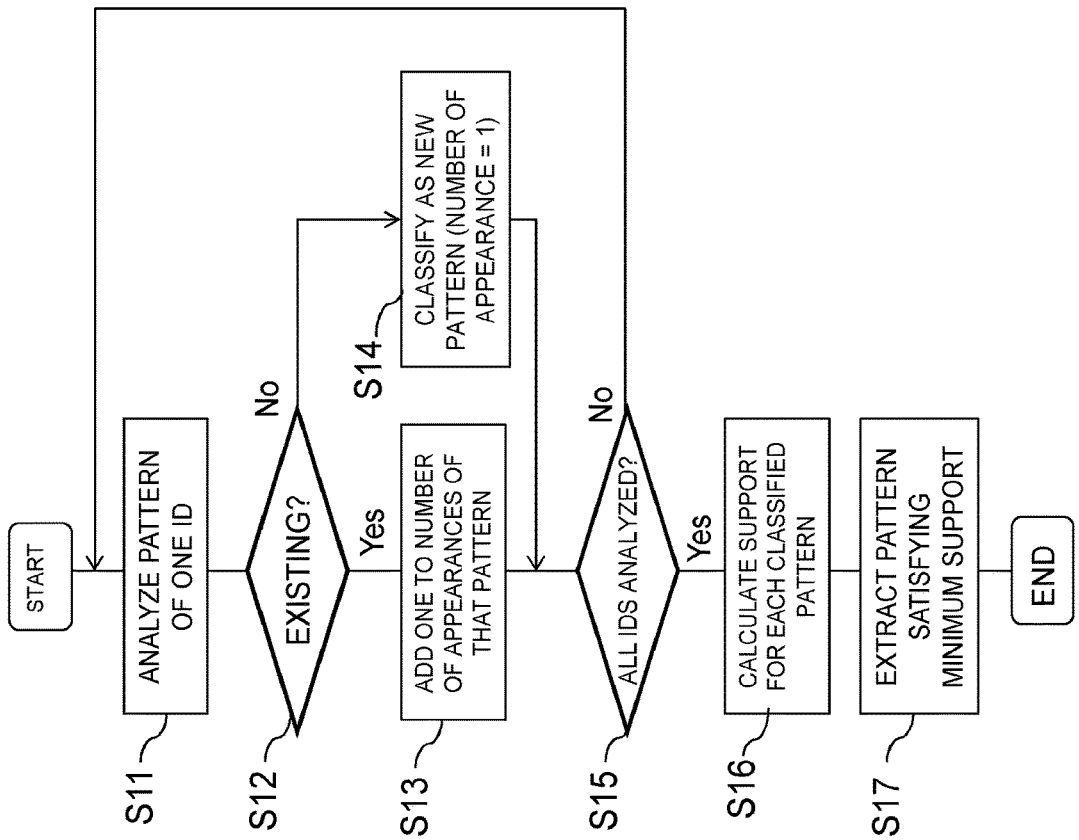
[FIG6]

[FIG7]

| PATTERN | SUPPORT |
|---|---|
| {WEATHER: SUNNY, TEMPERATURE: NORMAL 1} -> {CONGESTION: OCCUR} | 0.4 |
| {WEATHER: SUNNY, TEMPERATURE: NORMAL 1} -> {NUMBER OF PEOPLE GOING OUT: NORMAL 2} | 0.3 |
| {TYPE OF DAY: WEEKDAY} -> {NUMBER OF PEOPLE GOING OUT: MANY} -> {CONGESTION: OCCUR} | 0.3 |
| {WEATHER: SUNNY} -> {CONGESTION: OCCUR} | 0.5 |
| {WEATHER: RAINY} -> {CONGESTION: NOT OCCUR} | 0.3 |
| {TEMPERATURE: HIGH} -> {CONGESTION: NOT OCCUR} | 0.4 |
| {TYPE OF DAY: WEEKDAY} -> {NUMBER OF PEOPLE GOING OUT: FEW} -> {CONGESTION: NOT OCCUR} | 0.4 |
| {WEATHER: CLOUDY, TEMPERATURE: NORMAL 1} -> {NUMBER OF PEOPLE GOING OUT: MANY} | 0.3 |

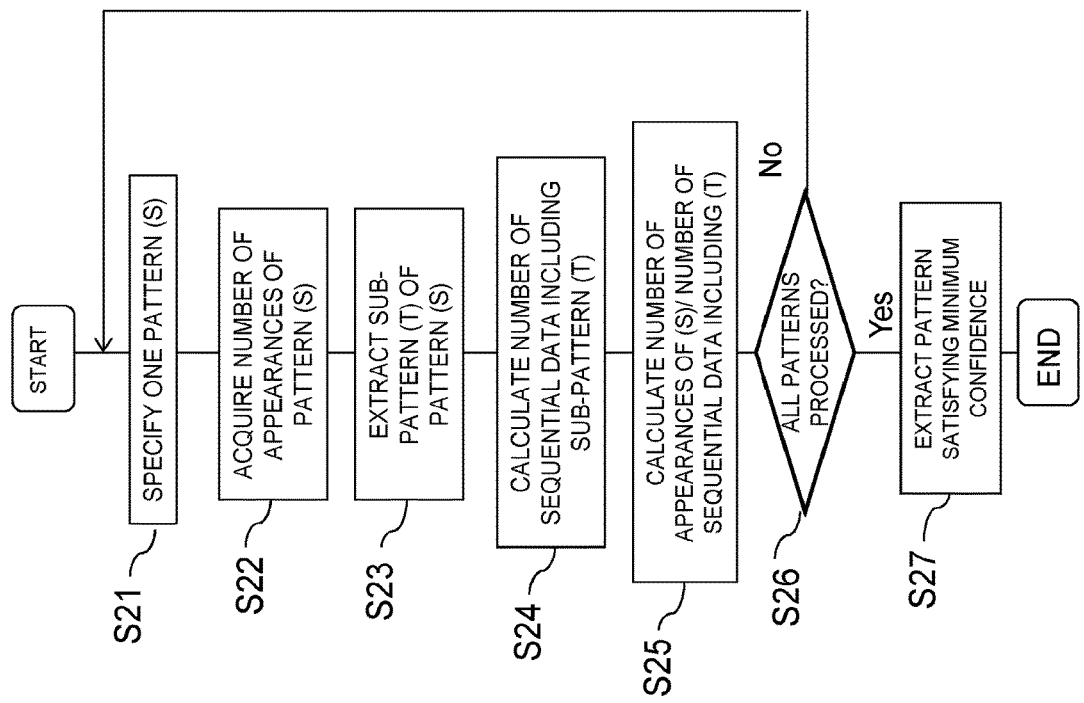
[FIG8]

[FIG9]

| PATTERN | SUPPORT | CONFIDENCE |
|---|---|---|
| {WEATHER: SUNNY, TEMPERATURE: NORMAL 1} -> {CONGESTION: OCCUR} | 0.4 | 0.6 |
| {WEATHER: SUNNY, TEMPERATURE: NORMAL 1} -> {NUMBER OF PEOPLE GOING OUT: NORMAL 2} | 0.3 | 0.3 |
| {TYPE OF DAY: WEEKDAY} -> {NUMBER OF PEOPLE GOING OUT: MANY} -> {CONGESTION: OCCUR} | 0.3 | 0.5 |
| {WEATHER: SUNNY} -> {CONGESTION: OCCUR} | 0.5 | 0.4 |
| {WEATHER: RAINY} -> {CONGESTION: NOT OCCUR} | 0.3 | 0.5 |
| {TEMPERATURE: HIGH} -> {CONGESTION: NOT OCCUR} | 0.4 | 0.3 |
| {TYPE OF DAY: WEEKDAY} -> {NUMBER OF PEOPLE GOING OUT: FEW} -> {CONGESTION: NOT OCCUR} | 0.4 | 0.6 |
| {WEATHER: CLOUDY, TEMPERATURE: NORMAL 1} -> {NUMBER OF PEOPLE GOING OUT: MANY} | 0.3 | 0.5 |

[FIG10]

| ID | SELECTED PATTERN (CHARACTERISTIC PATTERN) | SUPPORT | CONFIDENCE |
|----|-------------------------------------------|---------|------------|
| P1 | {WEATHER: SUNNY, TEMPERATURE: NORMAL 1} -> {CONGESTION: OCCUR} | 0.4 | 0.6 |
| P2 | {TYPE OF DAY: WEEKDAY} -> {NUMBER OF PEOPLE GOING OUT: MANY} -> {CONGESTION: OCCUR} | 0.3 | 0.5 |
| P3 | {WEATHER: RAINY} -> {CONGESTION: NOT OCCUR} | 0.3 | 0.5 |
| P4 | {TYPE OF DAY: WEEKDAY} -> {NUMBER OF PEOPLE GOING OUT: FEW} -> {CONGESTION: NOT OCCUR} | 0.4 | 0.6 |

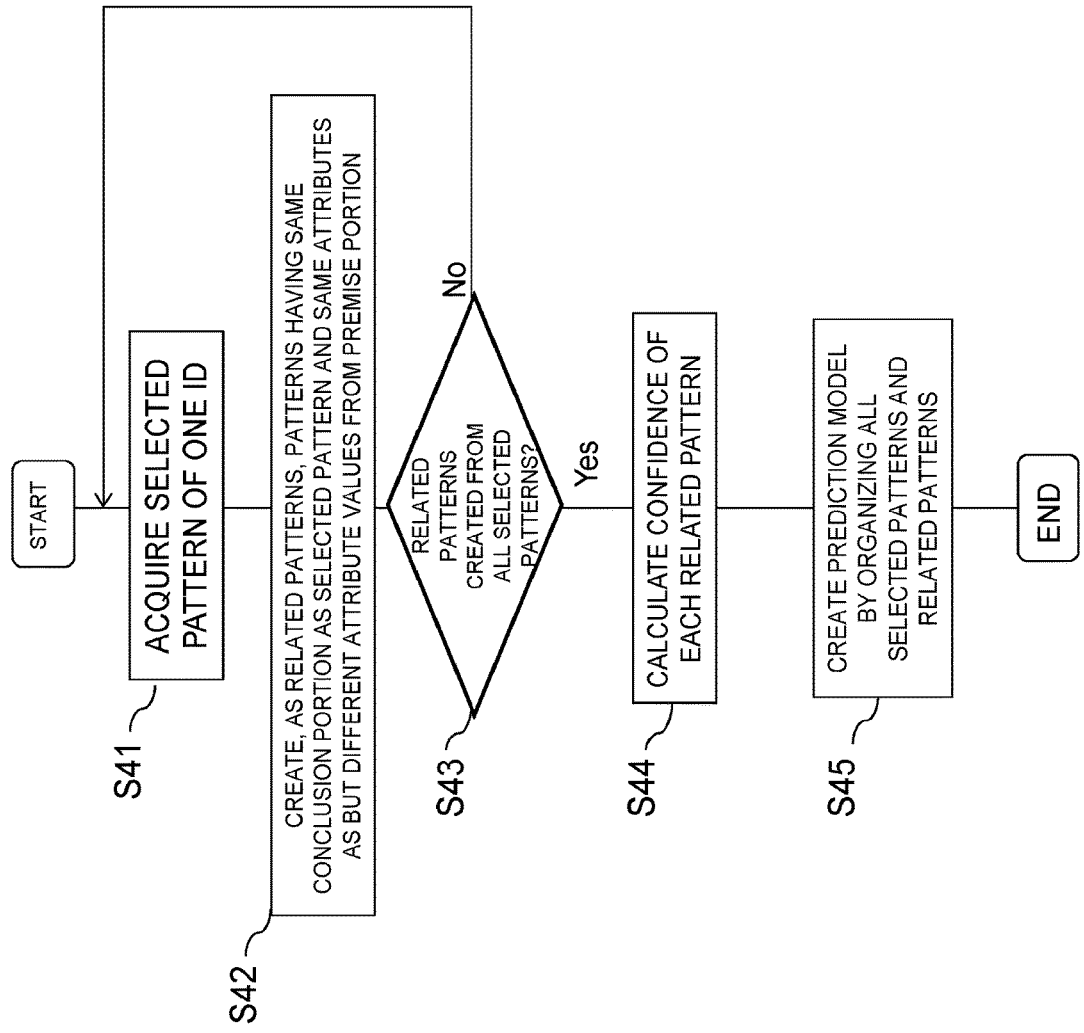
[FIG11]

[FIG12]

| RELATED PATTERN | CONFIDENCE |
|---|---|
| {WEATHER: SUNNY, TEMPERATURE: HIGH} -> {CONGESTION: OCCUR} | 0.4 |
| {WEATHER: SUNNY, TEMPERATURE: LOW} -> {CONGESTION: OCCUR} | 0.5 |
| {WEATHER: RAINY, TEMPERATURE: HIGH} -> {CONGESTION: OCCUR} | 0.3 |
| {WEATHER: RAINY, TEMPERATURE: NORMAL 1} -> {CONGESTION: OCCUR} | 0.4 |
| {WEATHER: RAINY, TEMPERATURE: LOW} -> {CONGESTION: OCCUR} | 0.2 |
| {WEATHER: CLOUDY, TEMPERATURE: HIGH} -> {CONGESTION: OCCUR} | 0.4 |
| {WEATHER: CLOUDY, TEMPERATURE: NORMAL 1} -> {CONGESTION: OCCUR} | 0.5 |
| {WEATHER: CLOUDY, TEMPERATURE: LOW} -> {CONGESTION: OCCUR} | 0.3 |

[FIG13]

| RELATED PATTERN | CONFIDENCE |
|---|---|
| {TYPE OF DAY: WEEKDAY} -> {NUMBER OF PEOPLE GOING OUT: NORMAL 2} -> {CONGESTION: OCCUR} | 0.3 |
| {TYPE OF DAY: WEEKDAY} -> {NUMBER OF PEOPLE GOING OUT: FEW} -> {CONGESTION: OCCUR} | 0.1 |
| {TYPE OF DAY: HOLLIDAY} -> {NUMBER OF PEOPLE GOING OUT: MANY} -> {CONGESTION: OCCUR} | 0.6 |
| {TYPE OF DAY: HOLIDAY} -> {NUMBER OF PEOPLE GOING OUT: NORMAL 2} -> {CONGESTION: OCCUR} | 0.4 |
| {TYPE OF DAY: HOLIDAY} -> {NUMBER OF PEOPLE GOING OUT: FEW} -> {CONGESTION: OCCUR} | 0.2 |

[FIG14]

| RELATED PATTERN | CONFIDENCE |
|---|---|
| {WEATHER: SUNNY} -> {CONGESTION: OCCUR} | 0.1 |
| {WEATHER: CLOUDY} -> {CONGESTION: OCCUR} | 0.3 |

[FIG15]

| RELATED PATTERN | CONFIDENCE |
|---|---|
| {TYPE OF DAY: WEEKDAY} -> {NUMBER OF PEOPLE GOING OUT: MANY} -> {CONGESTION: NOT OCCUR} | 0.2 |
| {TYPE OF DAY: WEEKDAY} -> {NUMBER OF PEOPLE GOING OUT: NORMAL 2} -> {CONGESTION: NOT OCCUR} | 0.4 |
| {TYPE OF DAY: HOLIDAY} -> {NUMBER OF PEOPLE GOING OUT: MANY} -> {CONGESTION: NOT OCCUR} | 0.1 |
| {TYPE OF DAY: HOLIDAY} -> {NUMBER OF PEOPLE GOING OUT: NORMAL 2} -> {CONGESTION: NOT OCCUR} | 0.3 |
| {TYPE OF DAY: HOLIDAY} -> {NUMBER OF PEOPLE GOING OUT: FEW} -> {CONGESTION: NOT OCCUR} | 0.5 |

[FIG16]

| ID | PREMISE PORTION | CONCLUSION PORTION | CONFIDENCE |
|---|---|---|---|
| M1 | {WEATHER, TEMPERATURE} | | |
| M1-1 | {WEATHER: SUNNY, TEMPERATURE: HIGH} | {CONGESTION: OCCUR} | 0.4 |
| M1-2 | {WEATHER: SUNNY, TEMPERATURE: NORMAL 1} | {CONGESTION: OCCUR} | 0.6 |
| M1-3 | {WEATHER: SUNNY, TEMPERATURE: LOW} | {CONGESTION: OCCUR} | 0.5 |
| M1-4 | {WEATHER: RAINY, TEMPERATURE: HIGH} | {CONGESTION: OCCUR} | 0.3 |
| M1-5 | {WEATHER: RAINY, TEMPERATURE: NORMAL 1} | {CONGESTION: OCCUR} | 0.4 |
| M1-6 | {WEATHER: RAINY, TEMPERATURE: LOW} | {CONGESTION: OCCUR} | 0.2 |
| M1-7 | {WEATHER: CLOUDY, TEMPERATURE: HIGH} | {CONGESTION: OCCUR} | 0.4 |
| M1-8 | {WEATHER: CLOUDY, TEMPERATURE: NORMAL 1} | {CONGESTION: OCCUR} | 0.5 |
| M1-9 | {WEATHER: CLOUDY, TEMPERATURE: LOW} | {CONGESTION: OCCUR} | 0.3 |
| M2 | {TYPE OF DAY} -> {NUMBER OF PEOPLE GOING OUT} | | |
| M2-1 | {TYPE OF DAY: WEEKDAY} -> {NUMBER OF PEOPLE GOING OUT: MANY} | {CONGESTION: OCCUR} | 0.5 |
| M2-2 | {TYPE OF DAY: WEEKDAY} -> {NUMBER OF PEOPLE GOING OUT: NORMAL 2} | {CONGESTION: OCCUR} | 0.3 |
| M2-3 | {TYPE OF DAY: WEEKDAY} -> {NUMBER OF PEOPLE GOING OUT: FEW} | {CONGESTION: OCCUR} | 0.1 |
| M2-4 | {TYPE OF DAY: HOLIDAY} -> {NUMBER OF PEOPLE GOING OUT: MANY} | {CONGESTION: OCCUR} | 0.6 |
| M2-5 | {TYPE OF DAY: HOLIDAY} -> {NUMBER OF PEOPLE GOING OUT: NORMAL 2} | {CONGESTION: OCCUR} | 0.4 |
| M2-6 | {TYPE OF DAY: HOLIDAY} -> {NUMBER OF PEOPLE GOING OUT: FEW} | {CONGESTION: OCCUR} | 0.2 |
| M3 | {WEATHER} | | |
| M3-1 | {WEATHER: SUNNY} | {CONGESTION: NOT OCCUR} | 0.1 |
| M3-2 | {WEATHER: RAINY} | {CONGESTION: NOT OCCUR} | 0.5 |
| M3-3 | {WEATHER: CLOUDY} | {CONGESTION: NOT OCCUR} | 0.3 |
| M4 | {TYPE OF DAY} -> {NUMBER OF PEOPLE GOING OUT} | | |
| M4-1 | {TYPE OF DAY: WEEKDAY} -> {NUMBER OF PEOPLE GOING OUT: MANY} | {CONGESTION: NOT OCCUR} | 0.2 |
| M4-2 | {TYPE OF DAY: WEEKDAY} -> {NUMBER OF PEOPLE GOING OUT: NORMAL 2} | {CONGESTION: NOT OCCUR} | 0.4 |
| M4-3 | {TYPE OF DAY: WEEKDAY} -> {NUMBER OF PEOPLE GOING OUT: FEW} | {CONGESTION: NOT OCCUR} | 0.6 |
| M4-4 | {TYPE OF DAY: HOLIDAY} -> {NUMBER OF PEOPLE GOING OUT: MANY} | {CONGESTION: NOT OCCUR} | 0.1 |
| M4-5 | {TYPE OF DAY: HOLIDAY} -> {NUMBER OF PEOPLE GOING OUT: NORMAL 2} | {CONGESTION: NOT OCCUR} | 0.3 |
| M4-6 | {TYPE OF DAY: HOLIDAY} -> {NUMBER OF PEOPLE GOING OUT: FEW} | {CONGESTION: NOT OCCUR} | 0.5 |

[FIG17]

| ID | EVALUATION DATA |
|----|-----------------|
| E1 | {WEATHER: SUNNY, TEMPERATURE: NORMAL 1, TYPE OF DAY: WEEKDAY} -> {NUMBER OF PEOPLE GOING OUT: NORMAL 2} |
| E2 | {WEATHER: RAINY, TEMPERATURE: LOW, TYPE OF DAY: WEEKDAY} |

[FIG18]

| ID | EVALUATION DATA | CONGESTION: OCCUR | CONGESTION: NOT OCCUR |
|---|---|---|---|
| E1 | {WEATHER: SUNNY, TEMPERATURE: NORMAL 1, TYPE OF DAY: WEEKDAY} -> {NUMBER OF PEOPLE GOING OUT: NORMAL 2} | 0.9 | 0.5 |
| E2 | {WEATHER: RAINY, TEMPERATURE: LOW, TYPE OF DAY: WEEKDAY} | 0.2 | 0.5 |

[FIG19]

| ID | EVALUATION DATA | PREDICTION RESULT | BASIS |
|---|---|---|---|
| E1 | {WEATHER: SUNNY, TEMPERATURE: NORMAL 1, TYPE OF DAY: WEEKDAY} -> {NUMBER OF PEOPLE GOING OUT: NORMAL 2} | CONGESTION: OCCUR | M1-2, M2-2 |
| E2 | {WEATHER: RAINY, TEMPERATURE: LOW, TYPE OF DAY: WEEKDAY} | CONGESTION: NOT OCCUR | M3-2 |

[FIG20]

SPECIFY CONDITION FOR LEARN DATA ANALYSIS (1) CONDITION FOR PATTERN EXTRACTION:
    1-1. ANY PATTERN WITH SUPPORT OF [0.3] OR HIGHER
    1-2. ANY PATTERN INCLUDING ITEM [*:*]

(2) EVALUATION OF EXTRACTED PATTERN:
    o CONFIDENCE    o LIFT     o CONFIDENCE AND LIFT (3) CONDITION FOR CHARACTERISTIC PATTERN SELECTION
    3-1. SELECT PATTERN WITH VALUE (2) OF [0.5] OR HIGHER
    3-2. SELECT PATTERN WITH CONCLUSION PORTION OF
        [CONGESTION: *]

· · ·

[ CONFIRM THE SELECTION ]

SEQUENTIAL DATA ANALYSIS APPARATUS AND PROGRAM

TECHNICAL FIELD

The present invention relates to a field of data mining for discovering (extracting) from a large amount of collected sequential data, as a pattern, a characteristic sequence of sets of items constituting sequential data and for predicting a result which newly provided sequential data is likely to lead to on the basis of the extracted pattern.

BACKGROUND ART

In the field of data mining, studies have been conducted to discover a pattern from sequential data. For example, Non-patent Document 1 has proposed a method of using the characteristic of a large pattern exhibiting an appearance frequency decreasing more monotonously than the appearance frequency of a small pattern to discover a frequent pattern with high efficiency. Patent Document 1 has proposed a method of discovering a frequent pattern in view of fluctuations in appearance order by focusing on a possible situation in which the appearance orders of items constituting sequential data are not necessarily identified uniquely even if they have the same meaning. In addition, Patent Document 2 has proposed a method of combining a pattern extracted from sequential data with a pattern designated as an attention target and considering an occurrence time lag between sets of items constituting patterns to analyze the pattern related to the pattern designated as the attention target with the temporal aspect taken into account.

PRIOR ART DOCUMENTS

Non-Patent Documents

[Non-Patent Document 1] R. Agrawal, R. Srikant, "Mining Sequential Patterns: Generalizations and Performance improvements," in proceedings of International Conference on Extending Database Technology, 1996

[Non-Patent Document 2] Shigeaki Sakurai, Rumi Hayakawa, Hideki Iwasaki, "The Effect of Constraints among Items for an Sequential Pattern Analysis," Proceedings of the 27th Annual Conference of the Japanese Society for Artificial Intelligence, 2C1-5, 2013

PATENT DOCUMENTS

[Patent Document 1] Japanese Patent Laid-Open No. 2008-17643
[Patent Document 2] Japanese Patent Laid-Open No. 2007-66058

DISCLOSURE OF THE INVENTION

Problems to be Solved by the Invention

It is an object of the present invention to provide a sequential data analysis apparatus and program for discovering a useful pattern from sequential data and, when new (second) sequential data is provided, predicting what result the second sequential data is likely to lead to, by using the discovered useful pattern.

Means for Solving the Problems

A sequential data analysis apparatus according to an embodiment is provided for extracting a pattern satisfying a condition from sequential data formed of a plurality of different items and for predicting, based on the pattern, a possibility that newly provided sequential data may lead to a particular result. The apparatus includes a learn data storage section storing, as learn data, a group of first sequential data, the first sequential data including a plurality of different sets of items arranged serially; a pattern extracting section configured to extract a pattern consisting of two or more sets of items from the first sequential data based on an appearance frequency of each of the sets of items; a pattern selecting section configured to select, from the extracted pattern, a pattern of two or more sets of items based on an appearance frequency of a sub-pattern formed of a portion of the extracted pattern; a related pattern creating section configured to create a related pattern including the same last set of items as and the other sets of items different from the selected pattern; an evaluation value calculating section configured to calculate an evaluation value of the related pattern based on an appearance frequency of a sub-pattern formed of a portion of the related pattern; a prediction model creating section configured to create a prediction model by organizing data of the characteristic pattern and the related pattern; and a result predicting section configured to apply second sequential data to the prediction model to determine a result which the second sequential data is likely to lead to, the second sequential data corresponding to a subset of the learn data.

BRIEF DESCRIPTION OF THE DRAWINGS

FIG. 1 A diagram showing an example of configuration of a sequential data analysis apparatus according to Embodiment 1, a block diagram showing the relationship between parts serving as main components of the apparatus.

FIG. 2 A flow chart showing a processing flow up to the creation of a prediction model in a sequential data analysis program and the sequential data analysis apparatus.

FIG. 3 A flow chart of processing for performing prediction on evaluation data in the sequential data analysis program and apparatus.

FIG. 4 A diagram showing the relationship between an attribute and attribute values constituting each item.

FIG. 5 A diagram showing learn data stored in a learn data storage section.

FIG. 6 A flow chart for explaining pattern extraction processing.

FIG. 7 A diagram showing the relationship between patterns discovered (extracted) by a pattern extracting section and their supports.

FIG. 8 A flow chart for explaining each processing of calculation of extracted pattern confidences and characteristic pattern selection.

FIG. 9 A diagram showing the relationship between extracted patterns and confidences calculated as evaluation values.

FIG. 10 A diagram showing the relationship between selected patterns selected by a pattern selecting section, their supports, and their confidences.

FIG. 11 A flow chart for explaining each processing of related pattern creation, calculation of related pattern confidences, and prediction model creation.

FIG. 12 A diagram showing the relationship between related patterns created from a selected pattern P1 and their confidences.

FIG. 13 A diagram showing the relationship between related patterns created from a selected pattern P2 and their confidences.

FIG. 14 A diagram showing the relationship between related patterns created from a selected pattern P3 and their confidences.

FIG. 15 A diagram showing the relationship between related patterns created from a selected pattern P4 and their confidences.

FIG. 16 A diagram showing an example of a prediction model created by a prediction model creating section.

FIG. 17 A diagram showing evaluation data stored in an evaluation data storage section.

FIG. 18 A diagram showing evaluation values for each conclusion portion calculated by applying the evaluation data to the prediction model.

FIG. 19 A diagram showing the relationship between the results predicted for the evaluation data, their confidences, and reasons serving as their bases.

FIG. 20 A diagram showing an example of a condition setting screen.

MODE FOR CARRYING OUT THE INVENTION

A preferred embodiment of the present invention will hereinafter be described with reference to the accompanying drawings.

Definition of Terms

In the following description, the term "sequential data" refers to data including a plurality of items or sets of items arranged in sequence, that is, serially to have a previous and subsequent relationship. The sequential data is represented with a symbol "→" to define the previous and subsequent relationship between the sets of items. Specifically, a set of items on the left of the arrow "→" is on a "previous" side, while a set of items on the right is on a "subsequent" side.

The term "an item" refers to a pair of data consisting of an attribute and an attribute value. For example, an attribute "weather" is paired with an attribute value "sunny," "rainy," or "cloudy" to form a single item.

The term "a set of items" refers to a set of one or more items. A single set of items is enclosed by { } (curly brackets).

The term "a pattern" is defined as a subset of sequential data taken out of sequential data by specifying a certain condition.

A sequential data analysis apparatus according to an embodiment analyzes and learns a plurality of sequential data stored as a learn target (that is, a set of sequential data or a group of sequential data, hereinafter referred to also as "learn data"), creates a prediction model as the result of learn, and based on the result of learn (prediction model), performs control (data processing) for predicting what result, conclusion, or outcome (hereinafter referred to simply as "result") is likely to occur from the content of second sequential data to be evaluated (hereinafter referred to also as "evaluation data").

The apparatus is applicable to a wide variety of fields including discovery of a rule of purchase in commodity sales at supermarkets and the like (for example, "90% of purchases of a commodity A and a commodity B involve purchase of a commodity C as well"), discovery of a causal relationship between a dose of particular medicine and the resulting side effect in the medical field, discovery of various rules in fields of forecast and prediction such as weather forecast and congestion forecast, discovery of a characteristic causal relationship between characteristics of an office and a type of mistake made in clerical work in banking business, and discovery of viewer preferences found between viewer characteristics and viewing histories for program recommendations. These are illustrative, and the apparatus is not limited to those fields.

Description is now made of a case example in which the apparatus is used to attempt to discover a rule relating to occurrence of traffic congestion for forecast or prediction of congestion. Specifically, this is the case example in which the apparatus receives and learns past data about congestion on a road leading to a facility (theme park) as learn data (first sequential data) to create a prediction model, and receives a current or future condition as evaluation data (second sequential data) to investigate the possibility of occurrence of traffic congestion under that condition.

FIGS. 1 to 20 are diagrams showing Embodiment 1. FIG. 1 is a block diagram showing main components of a sequential data analysis apparatus 100 according to the present embodiment. In FIG. 1, arrows connecting between the components indicate directions of data flow. The apparatus includes a learn data storage section 10 which stores, as learn data, a group of first sequential data including different sets of items arranged serially, an evaluation data storage section 20 which stores evaluation data serving as second sequential data, a pattern extracting section 30 which extracts, from the learn data, a pattern of two or more sets of items satisfying a predetermined condition based on an appearance frequency of each set of items, a characteristic pattern selecting section 40 which selects, from the extracted pattern, a pattern of two or more sets of items as a characteristic pattern based on an appearance frequency of each sub-pattern formed of a portion of the extracted pattern, a related pattern creating section 50 which creates a related pattern having the same last set of items as and the other sets of items different from the selected characteristic pattern, an evaluation value calculating section 60 which calculates evaluation values for the characteristic pattern and the related pattern based on the appearance frequency of each sub-pattern formed of a portion of the pattern, a prediction model creating section 70 which creates a prediction model by organizing the data of the characteristic pattern and the related pattern, and a result predicting section 80 which applies, as the evaluation data, the second sequential data corresponding to a subset of learn data to the prediction model to determine a result which the evaluation data is likely to lead to.

The apparatus can be realized by storing data of a sequential data analysis program for executing each processing, later described, on an external storage medium such as a hard disk device, not shown, and reading such a program into a personal computer (PC). In this case, for example, the hard disk device of the computer or a storage device such as a RAM can serve as the learn data storage section 10 and the evaluation data storage section 20, and a control device such as a CPU can serve as the pattern extracting section 30, the characteristic pattern selecting section 40, the related pattern creating section 50, the evaluation value calculating section 60, the prediction model creating section 70, and the result predicting section 80. The result of processing in each section can be displayed on a display section (not shown) such as an LCD of the apparatus (PC) or can be printed on a printer (not shown), as required.

The sequential data analysis program can be implemented on a server which communicates with a client terminal over a communication network. In this case, learn data or evaluation data transmitted from an external client terminal via a transmit/receive section, not shown, of the server can be stored in the learn data storage section 10 or the evaluation data storage section 20. In addition, the result of processing performed at the server can be transmitted to the external client terminal via the transmit/receive section. When the apparatus is implemented, for example on a POS system, learn data received at a transmit/receive section can be stored directly in the learn data storage section 10.

As described later, each of the learn data and the evaluation data has a predetermined data structure (format) as sequential data, so that the apparatus may have an edit function, a conversion function, a check function and the like for data in terms of the format.

FIGS. 2 and 3 show the overviews of processing based on the operations of those components. FIG. 2 is a flow chart showing a processing flow up to the creation of the prediction model, and the processing is based on the operations of the learn data storage section 10, the pattern extracting section 30, the characteristic pattern selecting section 40, the related pattern creating section 50, the evaluation value calculating section 60, and the prediction model creating section 70. FIG. 3 is a flow chart of processing for performing evaluation of evaluation data after the prediction model, that is, prediction of the result, and the processing is based on the operations of the evaluation data storage section 20 and the result predicting section 80.

The processing in FIG. 2 is now described in outline. Pattern extraction at step 1 is a step of reading, by the pattern extracting section 30, learn data corresponding to a group of first sequential data stored as a learn target to extract a plurality of patterns corresponding to sequential data or subsets of sequential data that satisfy a specified first condition. Pattern confidence calculation at step S2 is a step of calculating, by the evaluation calculating section 60, an evaluation value for each of the extracted patterns. Characteristic pattern selection at step S3 is a step of selecting, by the characteristic pattern selecting section 40, a pattern satisfying a specified second condition as a characteristic pattern from the plurality of extracted patterns. Subsequent step S4 is a step of creating, by the related pattern creating section 50, a pattern having items related to the extracted characteristic pattern, specifically, a pattern having the same conclusion portion and a different premise portion, as a related pattern. Next step 5 is a step of calculating, by the evaluation value calculating section 60, an evaluation value for each created related pattern with reference to the learn data. Prediction model creation at step S6 is a step of creating, by the prediction model creating section 70, a prediction model by organizing the characteristic pattern and the related pattern.

FIG. 5 shows an example of the learn data (group of first sequential data) stored in the learn data storage section 10. FIG. 17 shows an example of the evaluation data (group of second sequential data) stored in the evaluation data storage section 20. Those figures show examples of sequential data used when a rule relating to occurrence of traffic congestion is attempted to be discovered as described above.

In this case example, for the purpose of using past data about congestion on a road as the learn data (first sequential data) to attempt to discover a rule relating to occurrence of traffic congestion in congestion forecast, the learn data includes both of premise conditions (such as weather and temperature) and the results (such as the presence or absence of congestion and many or few people going out) arranged in sequence. However, the specific content of the learn data including the data structure and types of items may depend on the purpose of data analysis and the like.

As described above, each of items constituting sequential data is formed of an attribute and an attribute value. In this case example, the attribute and the attribute value of sequential data are defined as shown in FIG. 4. In the example of FIG. 4, each combination of an attribute and an attribute value is defined as one item, such as "Weather: Sunny," "Weather: Rainy," "Weather: Cloudy," "Temperature: High," "Temperature: Normal 1," "Temperature: Low," "Type of Day: Weekday," "Type of Day: Holiday," "Number of People Going Out: Many," "Number of People Going Out; Normal 2," "Number of People Going Out: Few," "Congestion: Occur," and "Congestion: Not Occur." Since data for defining such items and sequential data are used during related pattern creation, later described, they can be stored previously in a predetermined storage region such as a system memory or a hard disk device, or can be created by the pattern extracting section 30 in pattern extraction (step S1), later described, and then stored in such a storage region.

In the present embodiment, as shown in FIG. 5, ":" is used as a separation symbol between the attribute and the attribute value in representation of each item, and sets of those items arranged serially and in time series are provided as sequential data.

It should be noted that, in the present embodiment, all items belonging to the same set of items are formed of different items (attributes). As described above, "→" is used as a separator between sets of items, an individual set of item is enclosed by "{ }," and items are separated by "," within a set of items.

For confirmation, as for the concept of "a set of items," even a single item (that is, information consisting of an attribute and an attribute value) enclosed by "{ }" is referred to as "a set of items (item set)." As for the concept of "sequential data," even a single "set of items" corresponds to sequential data if it includes a plurality of items (see evaluation data E2 in FIG. 17).

FIG. 5 shows the data structure of the learn data stored in the learn data storage section 10 and illustrates an example of a set of sequential data (group of sequential data) formed of the items shown in FIG. 4. The learn data in the present embodiment is stored in the learn data storage section 10 with a unique ID assigned to each sequential data. In this example, n sequential data from T1 to Tn constitute a set of sequential data, and the set of sequential data is put in a single file of the learn data and stored in the learn data storage section 10. In the learn data used for the present embodiment, each sequential data is formed of different sets of items. In other words, a plurality of sets of items belonging to one sequential data cannot be the same set.

More specifically, sequential data T1 includes a set of items consisting of "Weather: Sunny" and "Temperature: Normal 1" and an item set consisting only of "Congestion: Occur" arranged in order (time series in this case). Sequential data T6 includes an item set consisting only of "Weather: Rainy," an item set consisting only of "Number of People Going Out: Few," and an item set consisting only of "Congestion: Not Occur" arranged in order.

The difference between the first and second sequential data (that is, the learn data and the evaluation data) is now described. As apparent from comparison between FIG. 17 and FIG. 5, each sequential data includes different sets of items arranged serially, but the sequential data in the evaluation data cannot have more sets of items than those of the sequential data in the learn data. In other words, the sequential data in the evaluation data is a subset of sequential data in the learn data.

For performing each processing in the apparatus, it is necessary to preset several conditions in addition to storage of the learn data and the evaluation data described above.

FIG. 20 shows an example of a condition setting screen displayed on the display section of the apparatus, and details thereof are described later. Various conditions input and set on the condition setting screen are stored on a predetermined storage medium such as a hard disk device or a system memory prior to processing.

In the apparatus, at step S1 in FIG. 2, the pattern extracting section 30 reads and processes the learn data (group of first sequential data) stored in the learn data storage section 10 to discover (extract) a plurality of patterns satisfying a preset or specified condition (discover of a condition satisfying pattern). Various conditions are contemplated for use in pattern extraction, and for example, the method in Non-Patent Document 1 described above can be used to extract a set of patterns. In this case, a "minimum support," later described, based on the appearance frequency of a set of items is used as a condition for pattern extraction.

In the following, more detailed operations of the pattern extraction processing are described with reference to a flow chart of FIG. 6. In the pattern extraction processing, the pattern extracting section 30 performs processing of reading learn data for each ID, that is, each sequential data, classifying the learn data, extracting sequential data with a high appearance frequency (a large number of appearances) and removing sequential data with a low appearance frequency (a small number of appearances) based on the appearance frequency of each set of items.

Specifically, at step S11, the pattern extracting section 30 reads sequential data assigned one ID of the learn data stored in the learn data storage section 10, analyzes a pattern, and saves the result of analysis in a workspace of a RAM or the like. At subsequent step S12, the pattern extracting section 30 determines whether or not the pattern analyzed at the preceding step is existing, that is, already present in the workspace. If existing, the pattern extracting section 30 proceeds to step S13 to add one to a counter indicating the number of pattern appearances, or if not existing, that is, if that is a new pattern, proceeds to step S14 to regard the pattern as a new pattern and set the number of appearances of the pattern to one.

At subsequent step S15, the pattern extracting section 30 determines whether or not all sequential data in the learn data storage section 10 have been analyzed. If any sequential data remains unanalyzed, the pattern extracting section 30 returns to step S11 to repeat the processing from step S11 to step S15 described above, or if all sequential data have been analyzed, proceeds to step S16. At step S16, the pattern extracting section 30 calculates a support for each classified pattern, and at subsequent step S17, removes any pattern not satisfying a minimum support from the workspace, extracts (outputs) any pattern satisfying the minimum support, and then completes the series of processing. FIG. 7 shows an example of the output patterns extracted at step S17. In the present embodiment, patterns satisfying the minimum support are output and displayed in the display section of the apparatus together with their support values.

The minimum support is a reference in evaluating the frequency of a pattern, and the support of each pattern is defined according to the following equation 1. When the pattern extracting section 30 extracts all patterns (in the example of FIG. 5, body portions of the sequential data, that is, portions excluding IDs in the sequential data T1, T2, . . . , Tn) from the read learn data (Yes at step S15), the pattern extracting section 30 calculates the support of each pattern according to the following equation 1 at step S16, determines whether or not the support is equal to or higher than the specified minimum support at step S17, and extracts any pattern having the support equal to or higher than the minimum support as a condition satisfying pattern.

$$\text{Support}(s) = \text{Number of Sequential Data Including } s/\text{Number of Sequential Data} \quad \text{(Equation 1)}$$

In the equation 1, s represents a pattern (in this example, a sequence of items excluding the ID). As apparent from the definition in the equation 1, the support of any pattern s is calculated as a value in a range [0,1]. For example, when there are ten sequential data and three of them include s, then the support of s is calculated as 0.3 (=3/10).

In addition to the condition of the minimum support, any pattern matching a constraint among items described in Non-Patent Document 2 may be extracted as a condition satisfying pattern (see FIG. 20). In this case, at step S17 described above, the pattern extracting section 30 extracts, as a condition satisfying pattern, a pattern (that is, a portion of sequential data) matching a sequence of items or an attribute and an attribute value corresponding to item components that is described (specified) as a constraint among items, as well as one which satisfies the minimum support.

For simplification, the following description assumes that the constraint among items is not added to the first condition and that the patterns shown in FIG. 7 (that is, entire sequential data) are extracted as patterns satisfying the first condition.

At step S2, the evaluation value calculating section 60 calculates, for each of the patterns extracted by the pattern extracting section 30, the evaluation value serving as a reference in pattern selection. Although various evaluation values can be used for patterns, "confidence," later described, is calculated as the evaluation value in this example.

FIG. 8 is an example of a sub-routine of step S2 and step S3 in FIG. 2. Step S2 corresponds to steps S21 through S26 in FIG. 8, and step S3 corresponds to step S27 in FIG. 8. In the following, the processing performed by the evaluation value calculating section 60 is described in more detail with reference to the flow chart of FIG. 8. The evaluation value calculating section 60 takes one pattern (s) out of the patterns extracted by the pattern extracting section 30 at step S21, and acquires the number of appearances of the pattern (s) (see step S13) at step S22.

Then, the evaluation value calculating section 60 removes the last set of items from the pattern (s) to extract one sub-pattern (t) serving as a premise portion (step S23), calculates the number of sequential data including the sub-pattern (t) (sequential data in the learn data) (step S24), and calculates the confidence, described later in detail, of the pattern (s) at step S25. The evaluation value calculating section 60 performs the processing from step S21 to S25 on all the patterns extracted by the pattern extracting section 30 (Yes at step S26), and then provides the data of confidence calculated for each pattern to the characteristic pattern selecting section 40 (see FIG. 1) to allow the characteristic pattern selecting section 40 to perform the processing at step S27.

In the following, the confidence calculated by the apparatus is described. At step S25, the evaluation value calculating section 60 calculates the confidence defined in the following equation 2 as the evaluation value of the pattern.

$$\text{Confidence}(s|t) = \text{Number of Sequential data Including } s/\text{Number of Sequential data including } t \quad \text{(Equation 2)}$$

In the equation 2, each of s and t represents a pattern, and the pattern t represents a sub-pattern excluding the last set of items from the pattern s. In the following, the sub-pattern t is referred to as a "premise portion," and the last set of items as a "conclusion portion."

Since an arbitrary pattern s is formed of more items than those of its premise portion (that is, sub-pattern t), and can be said to be under more strict conditions than the premise portion (pattern t), the number of sequential data including the pattern s is equal to or smaller than the number of sequential data including the premise portion. Thus, the confidence (s t) is calculated as a value in a range [0,1]. In other words, the value of the confidence is a value of probability that the same premise as that of the pattern s may lead to the same conclusion (result) as that of the pattern s.

By way of example, consider sequential data formed of items A: a, B:b, and C:c. It is assumed that a pattern s is given as {A:a}→{B:b}→{C:c} and that the number of sequential data including the pattern s is two in the learn data. In this case, {A:a}→{B:b} is extracted as a pattern t serving as the premise portion of the pattern s, and the number of sequential data including the pattern t in the learn data is equal to or larger than the number of sequential data including the pattern s, for example four. Then, the confidence (s|t) when t is given is calculated as 0.5 (=2/4).

In this manner, the evaluation value calculating section 60 calculates, for the single specified pattern (s), the number of sequential data including the entire pattern (s) in the learn data and the number of sequential data including the sub-pattern (t) excluding the last set of items from the entire pattern (s) (steps S22 and S23), and calculates the confidence of each pattern (step S25).

Although the numbers of patterns (s) and sub-patterns (t) can be calculated with reference to sequential data (learn data in the learn data storage section 10), the numbers can also be calculated during the pattern extraction (at step S1 described above) and stored in a RAM or the like, and then further calculation can be performed on the basis of the stored values as appropriate. FIG. 9 shows the results of the confidence calculation for each of the patterns illustrated in FIG. 7.

Next, the characteristic pattern selecting section 40 in the apparatus refers to the patterns extracted by the pattern extracting section 30 and the evaluation values (confidences) for the respective patterns calculated by the evaluation value calculating section 60 to select and extract characteristic patterns having a relatively high confidence (hereinafter referred to also as selected patterns) (step S3, step S27). In this example, to limit the range (types) of the conclusion portions of the selected patterns, one of the item (that is, both the attribute and the attribute value), the attribute, or the attribute value of the conclusion portion is specified (see FIG. 20). Based on the specification, the characteristic pattern selecting section 40 picks up, as the selected patterns, patterns that match the specified particular item, attribute, or attribute value and have a confidence equal to or higher than a preset minimum confidence.

By way of example, consider a case example in which the selected patterns are set prior to step S3 such that the conclusion portion is an item {Congestion: Occur} or an item {Congestion: Not Occur} and the minimum confidence is set to 0.5 (see FIG. 20). In this case, the characteristic pattern selecting section 40 selects and extracts four patterns shown in FIG. 10 from the patterns shown in FIG. 9 in the processing at step 3 (step S27).

FIG. 10 shows an example of display of the processing result at step S27 displaced in the display section. In the present embodiment, the selected and extracted patterns are assigned respective IDs (P1 to P4), and the values of support and confidence are displayed together. As shown, in this example, it can be seen that all the selected patterns P1 to P4 have the item {Congestion: Occur} or the item {Congestion: Not Occur} in their conclusion portions and confidence values of 0.5 or higher. Specifically, in the example of FIG. 9, the patterns in the fourth and sixth rows are not selected since they do not meet the minimum confidence although they satisfy the condition for the conclusion portion, and the pattern in the eighth row meeting the minimum confidence is not selected since it does not satisfy the condition for the conclusion portion.

As another example of the specification of the conclusion portion, the four patterns shown in FIG. 10 can also be selected from the patterns in FIG. 9 by specifying the attribute {Congestion}. Similarly, the above four patterns can also be selected by specifying the attribute value {Occur} or the attribute value {Not Occur} in the conclusion portion. In general, the specification of the conclusion portion can be changed as appropriate for the purpose of the data analysis and the like.

Although each attribute value is included by only one attribute in the present embodiment, the same attribute value may be included by different attributes in some items. In such a case, a single specified attribute value can represent a plurality of items, so that the number of conditions specified in pattern selection can be advantageously reduced.

At step S4, the related pattern creating section 50 creates a related pattern related to each of the selected patterns selected by the characteristic pattern selecting section 40. In the present embodiment, the related pattern creating section 50 creates, as the related pattern, a pattern having the same conclusion portion (that is, the last set of items) and the same attributes but different attribute values of the items constituting the premise portion (that is, the other sets of items) from those of the associated characteristic pattern.

Next, the processing performed by the related pattern creating section 50 is described specifically with reference to a flow chart of FIG. 11. The related pattern creating section 50 acquires one (assigned one ID) of the selected patterns selected by the characteristic pattern selecting section 40 (step S41) and creates, as its related pattern, a pattern having the same conclusion portion and the same attributes but different attribute values in the premise portion from those of the selected pattern (step S42).

By way of example, consider a case where a related pattern is created from a selected pattern P1 {Weather: Sunny, Temperature: Normal 1}→{Congestion: Occur} shown in FIG. 10. In the selected pattern P1, its premise portion {Weather: Sunny, temperature: Normal 1} is formed of one set of items including two items. In these two items, their attributes are "Weather" and "Temperature." The attribute value of "Weather" is "Sunny," and the attribute value of "Temperature" is "Normal 1." In the definition of the learn data (see FIG. 4), the attribute values of "Weather" include "Rainy" and "Cloudy" other than "Sunny," and the attribute values of "Temperature" include "High" and "Low" other than "Normal 1."

Thus, the following nine sets of items can be created from combinations of the items formed of the attributes and the attribute values.

(1) {Weather: Sunny, Temperature: High}
(2) {Weather: Sunny, Temperature: Normal 1}
(3) {Weather: Sunny, Temperature: Low}
(4) {Weather: Rainy, Temperature: High}
(5) {Weather: Rainy, Temperature: Normal 1}
(6) {Weather: Rainy, Temperature: Low}

(7) {Weather: Cloudy, Temperature: High}
(8) {Weather: Cloudy, Temperature: Normal 1}
(9) {Weather: Cloudy, Temperature: Low}

Of them, since (2) {Weather: Sunny, Temperature: Normal 1} is the combination of items matching the premise portion of the selected pattern P1, the eight combinations other than the above combination are used as the premise portions, and the conclusion portion {Congestion: Occur} of the selected pattern P1 is added to those premise portions, thereby creating eight patterns as related patterns. In this manner, related patterns shown in FIG. 12 can be created from the selected pattern P1.

In another case of a selected pattern P2 {Type of Day: Weekday}→{Number of People Going Out: Many}→{Congestion: Occur}, the premise portion is formed of two sets of items each including only one item. The attributes of the items of the premise portion are "Type of Day" and "Number of People Going Out." From the definition of the learn data (FIG. 4), the attribute values of "Type of Day" include "Weekday" and "Holiday," and the attribute values of "Number of People Going Out" include three, that is, "Many," "Normal 2," and "Few." As a result, the following six patterns can be created as sequences of the items formed of the attributes and the attribute values.

(1) {Type of Day: Weekday}→{Number of People Going Out: Many}
(2) {Type of Day: Weekday}→{Number of People Going Out: Normal 2}
(3) {Type of Day: Weekday}→{Number of People Going Out: Few}
(4) {Type of Day: Holiday}→{Number of People Going Out: Many}
(5) {Type of Day: Holiday}→{Number of People Going Out: Normal 2}
(6) {Type of Day: Holiday}→{Number of People Going Out: Few}

Of them, since (1) {Type of Day: Weekday}→{Number of People Going Out: Many} is the sequence of items matching the premise portion of P2, the five combinations other than the above sequence are used as the premise portions, and the conclusion portion {Congestion: Occur} of the selected pattern P2 is added to those premise portions, thereby creating five patterns as related patterns. In this manner, the related pattern creating section 50 creates related patterns shown in FIG. 13 from the selected pattern P2 at step S42. Similarly, the related pattern creating section 50 creates related patterns consisting of two patterns shown in FIG. 14 from the selected pattern P3, and creates related patterns consisting of five patterns shown in FIG. 15 from the selected pattern P4.

The selected patterns (P1 to P4) in this example have no description of an exemplary pattern in which the premise portion includes a sequence formed of a plurality of sets of items each formed of a plurality of items (for example, a premise portion {Weather: Sunny, Temperature: Low}→{Type of Day: Holiday, Number of People Going Out: Many} in a selected pattern). In this case, the related pattern creating section 50 similarly extracts, as related patterns, patterns in which premise portions correspond to sequences of sets of items created by combining all the attributes and attribute values included in each set of items and each sequence and the same conclusion portion as the conclusion portion of the selected pattern is added to those premise portions.

A related pattern of a selected pattern may be selected as a selected pattern. Since this may result in redundant creation of a related pattern from that selected pattern, the related pattern creating section 50 does not create such a related pattern redundantly at step S42. Specifically, when the same related pattern as an existing related pattern is created at step 42, the related pattern creating section 50 removes that related pattern.

As described above, in this apparatus, the related pattern creating section 50 repeats the processing of creating related patterns from each selected pattern (step S43, step S41). When related patterns are created from all the selected patterns (Yes step S43), the evaluation value calculating section 60 again performs processing at step S44.

At step S44, the evaluation value calculating section 60 calculates an evaluation value for each of the related patterns created by the related pattern creating section (step S5). Although this processing is basically the same as the processing of pattern confidence calculation at step S2 (that is, step S21 to step S26 in FIG. 8), a pattern to be processed is different. Although calculation of values necessary for the evaluation value calculation of the selected pattern can be performed additionally during the pattern extraction, such calculation of values cannot be necessarily performed for the related patterns. Thus, the evaluation value calculating section 60 refers directly to the learn data in the learn data storage section 10 (see FIG. 1) to calculate the evaluation value.

When the evaluation values of all the related patterns are calculated at step S44 (Yes at step S26), the prediction model creating section 70 performs processing of creating a prediction model at step S45 (step S6). In the example of the related patterns shown from FIG. 12 to FIG. 15, the confidence shown next to each related pattern is calculated as the evaluation value.

At step S45, the prediction model creating section 70 collects data of the selected patterns and the related patterns extracted from the selected patterns and creates a prediction model including the data of the selected patterns and the related patterns organized such that the patterns are listed for each premise portion and conclusion portion and the calculated evaluation value is added to each pattern.

The prediction model creating section 70 can create a prediction model shown in FIG. 16 from the selected patterns shown in FIG. 10 and the related pattern shown from FIG. 12 to FIG. 14. The prediction model is a list of data formed of IDs, premise portions, conclusion portions, and confidences, in which each selected pattern is assigned an ID having a branch number "–1" and each related pattern is assigned an ID having a branch number "–2" or higher.

With the processing described above, the prediction model can be created as the result of learning of the learn data provided in the form of sequential data. The apparatus applies newly provided evaluation data to the prediction model to predict a result which the evaluation data is likely to lead to in accordance with a flow chart of FIG. 3.

Evaluation data to be stored in the evaluation data storage section 20 is now described with reference to FIG. 17. The evaluation data shown in FIG. 17 is newly collected data in which evaluation data E1 is data indicating the weather, temperature, type of day, and number of people going out at the present time, and evaluation data E2 is data indicating type of day of the following day, predicted weather and temperature.

The evaluation data has the same format as that of the learn data described above and is stored in the evaluation data storage section 20 with a unique ID assigned to each sequential data. As can be seen from comparison with the learn data, however, the evaluation data in this case example has no set of items corresponding to the conclusion portion of the learn data but includes only the set of items corresponding to the premise portion. Specifically, in this case example, since the current weather condition and the like or predicted weather condition and the like (premise portion in the learn data) are used as the evaluation data in order to predict the presence or absence of occurrence of congestion, the evaluation data has no item of the conclusion portion, that is, no data about congestion (attribute) and occur/not occur (attribute value).

In the following, the operation of the apparatus after the prediction model creation is described with reference to the flow chart of FIG. 3. At step S61, the result predicting section 80 takes evaluation data assigned one ID out of a plurality of evaluation data (group of evaluation data) stored in the evaluation data storage section 20.

At step S62, the result prediction section 80 applies the taken one evaluation data to the prediction model to predict a result which the evaluation data is likely to lead to. Specifically, at step S62, the result predicting section 80 compares the pattern of the evaluation data with the premise portion of each pattern in the prediction model, and when the entire premise portion of any pattern in the prediction model is included in (the pattern of) the evaluation data, extracts the premise portion of that pattern in the prediction model, and then extracts the conclusion portion and the evaluation value associated with the extracted premise portion.

At subsequent step S63, the result predicting section 80 sums evaluation values having the same conclusion portion and calculates a conclusion portion evaluation value for each conclusion portion from the summed evaluation values. Finally, the result predicting section 80 compares the conclusion portion evaluation values to select and output one of the conclusion portions as a prediction result of that evaluation data. The result predicting section 80 repeatedly performs the processing for each evaluation data (step S64, step S61), and when processing is completed on all the evaluation data (Yes at step S64), outputs the processing result (step 65) and then ends the processing.

Although various conclusion portion evaluation values calculated by the result predicting section 80 are contemplated, an integrated value of evaluation values defined in the following equation 3 is calculated as the conclusion portion evaluation value in the present embodiment. The result predicting section 80 regards the conclusion portion having the largest conclusion portion evaluation value as the prediction result.

Conclusion Portion Evaluation Value(Conclusion
Portion $j$)=$\Sigma i=1, n\_j$ Evaluation Value $ij$ (Equation 3)

In the equation 3, the evaluation value ij represents an evaluation value of an ith pattern having a premise portion included in the evaluation value and a conclusion portion corresponding to a jth conclusion portion, and n_j represents the number of patterns selected for the jth conclusion portion.

By way of example, consider a case where the evaluation data E1 shown in FIG. 17 is taken at step S61 to be applied to the prediction model shown in FIG. 16. The evaluation data E1 is provided as {Weather: Sunny, Temperature: Normal 1, Type of Day: Weekday}→{Number of People Going Out: Normal 2}. At step S62, the result predicting section 80 refers to the premise portions of patterns M1-1 to M1-9, M2-1 to M2-6, M3-1 to M3-3, and M4-1 to M4-6 in the prediction model to search for any pattern having an item (a pair of an attribute and an attribute value) of "Weather: Sunny," "Temperature: Normal 1," "Type of Day: Weekday," or "Number of People Going Out: Normal 2" and having no other items in its premise portion, and extracts the premise portion of any matching pattern.

In this example, the premise portions of patterns M1-2, M2-2, M3-1, and M4-2 in the prediction model are {Weather: Sunny, Temperature: Normal 1}, {Type of Day: Weekday}→{Number of People Going Out: Normal 2}, {Weather: Sunny}, and {Type of Day: Weekday}→{Number of People Going Out: Normal 2}, respectively, and they are included in the evaluation value E1. Thus, at step S62, the result predicting section 80 extracts the premise portions of patterns M1-2, M2-2, M3-1, and M4-2 in the prediction model. In contrast, a pattern M1-1, for example, has the item "Temperature: High" not included in the evaluation data, so that the pattern M1-1 is not a target for extraction at step S62 since the entire premise portion is not included in the evaluation data although it has the item "Weather: Sunny" included in the evaluation data.

The conclusion portions of the patterns M1-2 and M2-2 are {Congestion: Occur}, and the conclusion portions of the patterns M3-1 and M4-2 are {Congestion: Not Occur}. At step S63, to sum the evaluation values having the same conclusion portion to calculate the conclusion portion evaluation value for each conclusion portion, the result predicting section 80 integrates the confidence values of the pattern M1-2 and pattern M2-2 and sets the integrated value 0.9 (=0.6+0.3) as the conclusion portion evaluation value of the conclusion portion {Congestion: Occur}. Similarly, the result predicting section 80 integrates the confidence values of the pattern M3-1 and pattern M4-2 and sets the integrated value 0.5 (=0.1+0.4) as the conclusion portion evaluation value of the conclusion portion {Congestion: Not Occur}. In addition, the result predicting section 80 compares the calculated conclusion portion evaluation values (0.9 and 0.5), determines that the conclusion portion {Congestion: Occur} providing the larger value 0.9 (>0.5) is the prediction result of the evaluation value E1, and outputs the result.

Since the evaluation data E2 {Weather: Rainy, Temperature: Low, Type of Day: Weekday} includes the premise portion {Weather: Rainy, Temperature: Low} and {Weather: Rainy} of patterns M1-6 and M3-2, respectively, in the prediction model, the conclusion portion evaluation value of the conclusion portion {Congestion: Occur} is 0.2, and the conclusion portion evaluation value of the conclusion portion {Congestion: Not Occur} is 0.5. The conclusion portion {Congestion: Not Occur} providing the larger value 0.5 (>0.2) is determined as the prediction result. FIG. 18 shows an exemplary display screen when the conclusion portion evaluation values of the respective conclusion portions are output in the display section after the calculation of the conclusion portion evaluation values for the evaluation data E1 and E2 and before the determination of the prediction result.

At step S64, the result predicting section 80 determines whether or not it has processed all the evaluation data, and when Yes, that is, when it has processed all the evaluation data, proceeds to step S65. When No, that is, when any evaluation data remains unprocessed, the result predicting section 80 returns to step 61 to repeat the processing from steps S61 to S64.

At step S65, the result predicting section 80 outputs the prediction result predicted for each evaluation data together with its basis for each evaluation data. FIG. 19 shows an exemplary display screen when the processing result at step S65 is output in the display section. Specifically, in this example, it can be seen that the prediction result for the evaluation data E1 is "Congestion: Occur," and the patterns M1-2 and M2-2 in the prediction model (FIG. 16) are used as the basis, and that the prediction result for the evaluation data E2 is "Congestion: Not Occur," and the pattern M3-2 in the prediction model is used as the basis. In this example, in addition to the prediction result as the prediction data, the ID of the pattern having the premise portion included by the evaluation data is output as the basis.

When no pattern to be extracted from the prediction model is found at step S62, the result predicting section 80 displays an error indicating that fact and ends the processing. When only one pattern to be extracted from the prediction model is found at step 62, the result predicting section 80 outputs the conclusion portion of that pattern, that is, the content of a sub-pattern formed of a portion of that pattern as the prediction result of the evaluation data.

With the processing described above, according to the sequential data analysis program and apparatus of the present embodiment, the result which the evaluation data is likely to lead to can be presented to an analyzer together with its basis.

In the prior art, although a useful pattern can be discovered from sequential data, how to interpret and use the discovered pattern is left to the determination of an analyzer. For this reason, when new sequential data is provided, it is not possible to use the useful pattern to predict a result which the sequential data is likely to lead to.

In contrast, according to the sequential data analysis program and apparatus of the present embodiment, a useful pattern (that is, a characteristic pattern) can be discovered from sequential data (learn data), new sequential data (evaluation data) can be provided, the discovered useful pattern can be used to predict a result which the evaluation data is likely to lead to, and the prediction result can be output and presented to the analyzer together with the basis of the prediction result.

The configuration of the sequential data analysis program and apparatus described above is not limited to the above embodiment.

For example, although the evaluation value calculating section 60 uses the confidence as the pattern evaluation value, the evaluation value may be calculated with a lift defined in the following equation 4 (see FIG. 20). Alternatively, both the confidence and the lift may be used as evaluation values, and the characteristic pattern selecting section 40 may select patterns based on references provided by these two evaluation values.

$$\text{Lift}(s|t) = (\text{Number of Sequential Data Including}(s-t) \times \text{Number of Sequential Data Including } t)/\text{Number of Sequential Data Including } s \times \text{Number of Sequential Data} \quad \text{(Equation 4)}$$

In the equation 4, (s−t) represents a sub-pattern representing the conclusion portion provided by removing t from s.

In the above embodiment, the related pattern creating section 50 creates, as the related pattern, the pattern having the same conclusion portion and the same attribute but different attribute values in the premise portion. As another example, items may be previously grouped, and a pattern having an item in the premise portion replaced with another item included in the same group may be extracted as a related pattern.

The conclusion portion confidence calculated by the result predicting portion 80 may be given as a value defined in the following equation 5, for example.

$$\text{Conclusion Portion Evaluation Value}(\text{Conclusion Portion } j) = 1 - \pi i(1 - \text{Evaluation Value } ij) \quad \text{(Equation 5)}$$

In the equation 5, $\pi i$ represents integration of i elements.

For example, when the selected conclusion portion evaluation value in the prediction result selection by the result predicting section 80 does not satisfy a predetermined condition such as being lower than a specified minimum value, a determination that prediction is impossible may be made, instead of providing the selected conclusion portion as the prediction result.

In the above embodiment, the result predicting section 80 outputs (displays) the content of the employed conclusion portion (that is, the last set of items) of the characteristic pattern and/or the related pattern in the prediction model as the prediction result and the ID of that pattern as the basis (FIG. 19). Additionally or alternatively, the calculated conclusion portion evaluation value may be output.

The "sequential data" to be learned and evaluated in the apparatus may include various forms. Other examples thereof include sequences of sets of items representing names of various commodities in the retail trade used for predicting hit products or salable products, and combinations of test items and their levels in the healthcare field.

Other variations and modifications may be made without departing from spirit or scope of the present invention.

As described above, according to the embodiment, the prediction model is constructed on the basis of the patterns (that is, the time-series patterns) having the premise portions and the conclusion portions extracted from the learn data, and when new sequential data (evaluation data) is provided, it is possible to predict a result which the sequential data is likely to lead to. The basis indicating that the sequential data is likely to lead to the predicted result can be presented to the analyzer (see FIG. 19) to give satisfaction with the prediction result. According to the present embodiment, it is also possible to extract, as the related pattern, any pattern which is less likely to be discovered due to a small number of appearances in a typical sequential pattern discovery issue, and the prediction can be performed by taking the related pattern into account.

While the embodiment of the present invention has been described, the embodiment is presented as illustrative and is not intended to limit the scope of the invention. The new embodiment can be implemented in various other forms, and a variety of omissions, substitutions, and modifications may be made without departing from the spirit or scope of the invention. These embodiments and their variations are encompassed by the spirit or scope of the invention and by the invention described in the appended claims and equivalents thereof.

DESCRIPTION OF THE REFERENCE NUMERALS

100 SEQUENTIAL DATA ANALYSIS APPARATUS
10 LEARN DATA STORAGE SECTION
20 EVALUATION DATA STORAGE SECTION
30 PATTERN EXTRACTING SECTION
40 CHARACTERISTIC PATTERN SELECTING SECTION
50 RELATED PATTERN CREATING SECTION
60 EVALUATION VALUE CALCULATING SECTION
70 PREDICTION MODEL CREATING SECTION
80 RESULT PREDICTING SECTION

The invention claimed is:

1. A sequential data analysis apparatus for extracting a pattern satisfying a condition from sequential data formed of a plurality of different items and for predicting, based on the pattern, a possibility that newly provided sequential data may lead to a particular result, comprising:
processing circuitry configured to:
store, as learn data, a group of first sequential data, the first sequential data including a plurality of different sets of items arranged serially;
the sequential data analysis apparatus configured to learn the first sequential data by:

extracting a pattern consisting of two or more sets of items from the first sequential data based on an appearance frequency of each of the two or more sets of items, each of the two or more sets of items in the pattern is formed of an attribute and an attribute value;

selecting, from the extracted pattern consisting of the two or more sets of items, a pattern of two or more sets of items as a characteristic pattern based on an appearance frequency of a sub-pattern formed of a portion of the extracted pattern;

creating a related pattern by modifying the characteristic pattern selected from the extracted pattern such that non-last sets of items in the related pattern are different from the selected characteristic pattern, wherein when creating the related pattern, the processing circuitry is further configured to extract patterns in which premise portions correspond to sequences of sets of items created by combining all attributes and attribute values included in each of the two or more sets of items and each sequence, and add a conclusion portion of the selected pattern to the premise portions; and calculating an evaluation value of the extracted pattern based on the appearance frequency of the sub-pattern formed of the portion of the extracted pattern, and calculating an evaluation value of the related pattern based on an appearance frequency of a sub-pattern formed of a portion of the related pattern;

creating a prediction model, based on the learned first sequential data, by organizing data of the characteristic pattern and the related pattern;

applying second sequential data to the prediction model to determine a result which the second sequential data is likely to lead to, the second sequential data corresponding to a subset of the learn data; and performing control data processing based on the result;

wherein the processing circuitry is configured to create the prediction model, including the characteristic pattern, the related pattern, and evaluation values for each of the characteristic pattern, the extracted pattern, and the related pattern;

the processing circuitry is configured to match the second sequential data with the prediction model, and, using the evaluation value of the characteristic pattern or the evaluation value of the related pattern, to extract the result which the second sequential data is likely to lead to, the result being based on a last set of items included in the prediction model;

the processing circuitry is configured to select, as the characteristic pattern, a pattern having the evaluation value equal to or higher than a predetermined value;

wherein a plurality of different sets of items are arranged in the first sequential data and a last set of items is arranged in series as a result of a causal relationship with at least another set of items;

the processing circuitry is configured to refer to a set of items other than the last set of items of the characteristic pattern and the related pattern in the prediction model, to extract the characteristic pattern and/or the related pattern having the set of items included in the second sequential data, and to determine, based on the last set of items and the evaluation value of the extracted pattern, the result which the second sequential data is likely to lead to; and the processing circuitry is configured to integrate, when the extracted pattern comprises a plurality of patterns and the plurality of patterns have the last sets of items different from each other, evaluation values of patterns having a same last set of items to calculate a conclusion portion evaluation value, and to generate a prediction of the result the second sequential data is likely to lead to by outputting content of the last set of items of one of the patterns having a high conclusion portion evaluation value as the result which the second sequential data is likely to lead to;

the high conclusion portion evaluation value being calculated based on:

Conclusion Portion Evaluation Value(Conclusion Portion $j$)=$\Sigma i=1, n\_j$ Evaluation Value ij, wherein the evaluation value ij represents an evaluation value of an $i^{th}$ pattern having a premise portion included in the evaluation value and a conclusion portion corresponding to a $j^{th}$ conclusion portion, and n_j represents the number of patterns selected for the $j^{th}$ conclusion portion.

2. The sequential data analysis apparatus according to claim 1, wherein the processing circuitry is configured to output the content of the last set of items of the one of the patterns in the prediction model serving as a basis of a determination of the content as the result which the second sequential data is likely to lead to.

3. The sequential data analysis apparatus according to claim 1, wherein the processing circuitry is further configured to transmit and receive data to and from a client terminal over a communication network, wherein the processing circuitry stores learn data transmitted from the client terminal.

4. A sequential data analysis method for extracting a pattern satisfying a condition from sequential data formed of a plurality of different items and for predicting, based on the pattern, a possibility that newly provided sequential data may lead to a particular result, comprising:

storing, as learn data, a group of first sequential data, the first sequential data including a plurality of different sets of items arranged serially;

a sequential data analysis apparatus configured to learn the first sequential data by:

extracting a pattern consisting of two or more sets of items from the first sequential data based on an appearance frequency of each of the two or more sets of items, each of the two or more sets of items in the pattern is formed of an attribute and an attribute value;

selecting, from the extracted pattern consisting of the two or more sets of items, a pattern of two or more sets of items as a characteristic pattern based on an appearance frequency of a sub-pattern formed of a portion of the extracted pattern;

creating step of creating a related pattern by modifying the characteristic pattern selected from the extracted pattern such that non-last sets of items in the related pattern are different from the selected characteristic pattern, wherein creating the related pattern includes extracting patterns in which premise portions correspond to sequences of sets of items created by combining all attributes and attribute values included in each of the two or more sets of items and each sequence, and adding a conclusion portion of the selected pattern to the premise portions; and calculating an evaluation value of the extracted pattern based on the appearance frequency of the sub-pattern formed of the portion of the extracted pattern;

creating a prediction model, based on the learned first sequential data, by organizing data of the characteristic pattern the related pattern;

applying second sequential data to the prediction model to determine a result which the second sequential data is likely to lead to, the second sequential data corresponding to a subset of the learn data; and performing control data processing based on the result;

wherein creating the prediction model includes the characteristic pattern, the related pattern, and evaluation values for each of the characteristic pattern, the extracted pattern, and the related pattern;

matching the second sequential data with the prediction model, and, using the evaluation value of the characteristic pattern or the evaluation value of the related pattern, extracting the result which the second sequential data is likely to lead to, the result being based on a last set of items included in the prediction model;

the sequential data analysis method further comprising:

selecting, as the characteristic pattern, a pattern having the evaluation value equal to or higher than a predetermined value;

wherein a plurality of different sets of items are arranged in the first sequential data and a last set of items is arranged in series as a result of a causal relationship with at least another set of items;

referring to a set of items other than the last set of items of the characteristic pattern and the related pattern in the prediction model, to extract the characteristic pattern and/or the related pattern having the set of items included in the second sequential data, and to determine, based on the last set of items and the evaluation value of the extracted pattern, the result which the second sequential data is likely to lead to; and integrating, when the extracted pattern comprises a plurality of patterns and the plurality of patterns have the last sets of items different from each other, evaluation values of patterns having a same last set of items to calculate a conclusion portion evaluation value, and to generate a prediction of the result the second sequential data is likely to lead to by outputting content of the last set of items of one of the patterns having a high conclusion portion evaluation value as the result which the second sequential data is likely to lead to;

the high conclusion portion evaluation value being calculated based on:

Conclusion Portion Evaluation Value(Conclusion Portion $j$)=$\Sigma i=1, n\_j$ Evaluation Value ij, wherein the evaluation value ij represents an evaluation value of an $i^{th}$ pattern having a premise portion included in the evaluation value and a conclusion portion corresponding to a $j^{th}$ conclusion portion, and n_j represents the number of patterns selected for the $j^{th}$ conclusion portion.

* * * * *